(12) United States Patent
Aguilar et al.

(10) Patent No.: US 6,298,379 B1
(45) Date of Patent: Oct. 2, 2001

(54) APPARATUS AND METHOD FOR MAINTAINING OPERATIONAL STATUS IN NETWORK COMPUTERS DURING SYSTEM MANAGEMENT OPERATIONS

(75) Inventors: Maximino Aguilar, Austin; James A. Brewer, Leander; John William Gorrell, Jr., Round Rock; Sanjay Gupta, Austin; James Michael Stafford, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/259,138

(22) Filed: Feb. 26, 1999

(51) Int. Cl.[7] ....................................... G06F 13/00
(52) U.S. Cl. ................................................ 709/223
(58) Field of Search ..................... 709/200, 201, 709/202, 220, 221, 222, 223, 224

(56) References Cited

U.S. PATENT DOCUMENTS

| | | | |
|---|---|---|---|
| 4,862,350 | * 8/1989 | Orr et al. | 709/213 |
| 5,546,539 | * 8/1996 | Poling | 709/205 |
| 5,841,988 | * 11/1998 | Chennubhotla et al. | 709/237 |
| 5,964,891 | * 10/1999 | Caswell et al. | 714/31 |
| 6,195,682 | * 2/2001 | Ho et al. | 709/203 |

\* cited by examiner

*Primary Examiner*—Moustafa M. Meky
(74) *Attorney, Agent, or Firm*—Casimer K. Salys; Russell D. Culbertson; Shaffer & Culbertson, LLP

(57) ABSTRACT

A network computer (12) receives instructions from a network manager (11), including a control interrupt instruction, a system management instruction, and a release instruction. A processor (16) associated with the network computer (12) executes the control interrupt instruction first to produce a control interrupt signal. This control interrupt signal causes an operating status controller (17) associated with the network computer (12) to disable local operational status control at the network computer. After local operational status control is disabled at the network computer (12), the processor (16) executes the system management instruction and performs a system management operation at the network computer. Finally, after the system management operation is completed, the processor (16) executes the release instruction to produce a release signal. The release signal causes the operational status controller (17) to enable local operational status control at the network computer (12).

12 Claims, 4 Drawing Sheets

APPARATUS AND METHOD FOR MAINTAINING OPERATIONAL STATUS IN NETWORK COMPUTERS DURING SYSTEM MANAGEMENT OPERATIONS

TECHNICAL FIELD OF THE INVENTION

This invention relates to computer systems and, more particularly, to an apparatus and method for controlling the operational status in a network computer while critical system management operations are performed by the network computer.

BACKGROUND OF THE INVENTION

Individual computers are commonly connected together in networks. The network connections facilitate communications between the individual computers and also allow processing tasks to be distributed to the individual computers. Various other processing devices may be connected in a network along with one or more computers. For example, a network may connect several individual computers, communications devices, environmental systems, and security systems. As the term is used in this disclosure, a "network" ) shall comprise any arrangement of processing devices in which the individual devices or systems are adapted to communicate with each other. A "network computer" may include any processing device which is included in the network, such as an individual personal computer for example.

A network requires a management system for managing communications between the individual devices included in the network, and for managing processes distributed throughout the network. A network management system may also manage both application software and system operational software associated with the individual devices or systems included in the network. For example, a network management system may be used to update or otherwise modify the startup or "boot" software on individual network computers. In this example, the network management system transmits a system management instruction to the selected network computers. This instruction is executed on each network computer causing each respective computer to write the desired new "boot" software code to the appropriate storage device associated with the computer.

In order to manage the network, the network management system may require constant access to the individual devices or systems which are included in the network. This access allows the network management system to direct the individual devices or systems to perform network management operations, such as the "boot" software update described above. Thus, the individual devices included in the network preferably remain in an operational state at all times, ready to process instructions from the network management system.

Problems arise in network management operations due to the local control commonly included in network computers. Individual network computers or other devices commonly have power switches which allow a user to turn the respective device off. Network computers or other devices also commonly include reset switches which may be activated by a user to reset the processor, or processors, associated with the computer. Should a network computer be turned off or reset while the computer is performing a critical network management task or operation, such as updating the "boot" software for example, the network management operation will be interrupted. In the "boot" software update example, such an interruption may leave the network computer in a condition in which it will not "boot" or start properly. Even if the interrupted operation does not leave the network computer in an inoperative condition, once the network computer returns to an operational state, the network management system will be required to locate and correct any problems resulting from the interrupted operation.

SUMMARY OF THE INVENTION

It is an object of invention to provide an apparatus, method, and program product for maintaining an individual network computer or other device a suitable operational state for performing network management operations.

The apparatus according to the invention includes a network interface for receiving instructions, and a processor or processing means for executing the instructions. Both the network interface and processor are associated with a network computer. The instructions received through the network interface include a control interrupt instruction, a system management instruction, and a release instruction. The processor executes the control interrupt instruction first to produce a control interrupt signal. An operational status controller included in the apparatus responds to the control interrupt signal by disabling local operational status control at the network computer. The processor next executes the system management instruction which causes the network computer to perform the desired system management operation. Finally, the processor executes the release instruction to produce a release signal. The operational status controller responds to the release signal by enabling local operational status control at the network computer. Thus, the apparatus according to the invention ensures that the desired operational status is maintained in the network computer, enabling the network computer to perform the desired system management operation without interference from the user of the network computer.

In some forms of the invention, the network computer will include a switch which may be activated by a user to change operational states in the network computer. For example, the computer may include a switching arrangement through which a user may produce an internal interrupt signal which causes an interrupt controller in the computer to issue an instruction placing the computer in a standby state. In this form of invention, the interrupt controller functions as the operational status controller, responding to the control interrupt signal by becoming unresponsive to the internal interrupt signal.

In another example, a switch associated with the network computer may be activated to provide a power-good signal which places the network computer in an active operational state. Removing the power-good signal normally places the network computer in another state, for example, turns the network computer off. In this example, the operational status controller includes control logic which causes the network computer to remain in the active operational state even after power-good signal is removed.

The method of invention includes receiving the control interrupt instruction, system management instruction, and release instruction at the network computer. The method further includes executing the control interrupt instruction to produce the control interrupt signal, and disabling local operational status control of the network computer in response to the control interrupt signal. After local operational status control is disabled, the method includes executing the system management structure to perform the desired system management operation at the network computer. Finally, the method includes executing the release instruction to produce the release signal, and enabling local operational status control in response to the release signal.

These and other objects, advantages, and features of the invention will be apparent from the following description of the preferred embodiments, considered along with the accompanying drawings.

DESCRIPTION OF THE PREFERRED EMBODIMENTS

Figure 1:
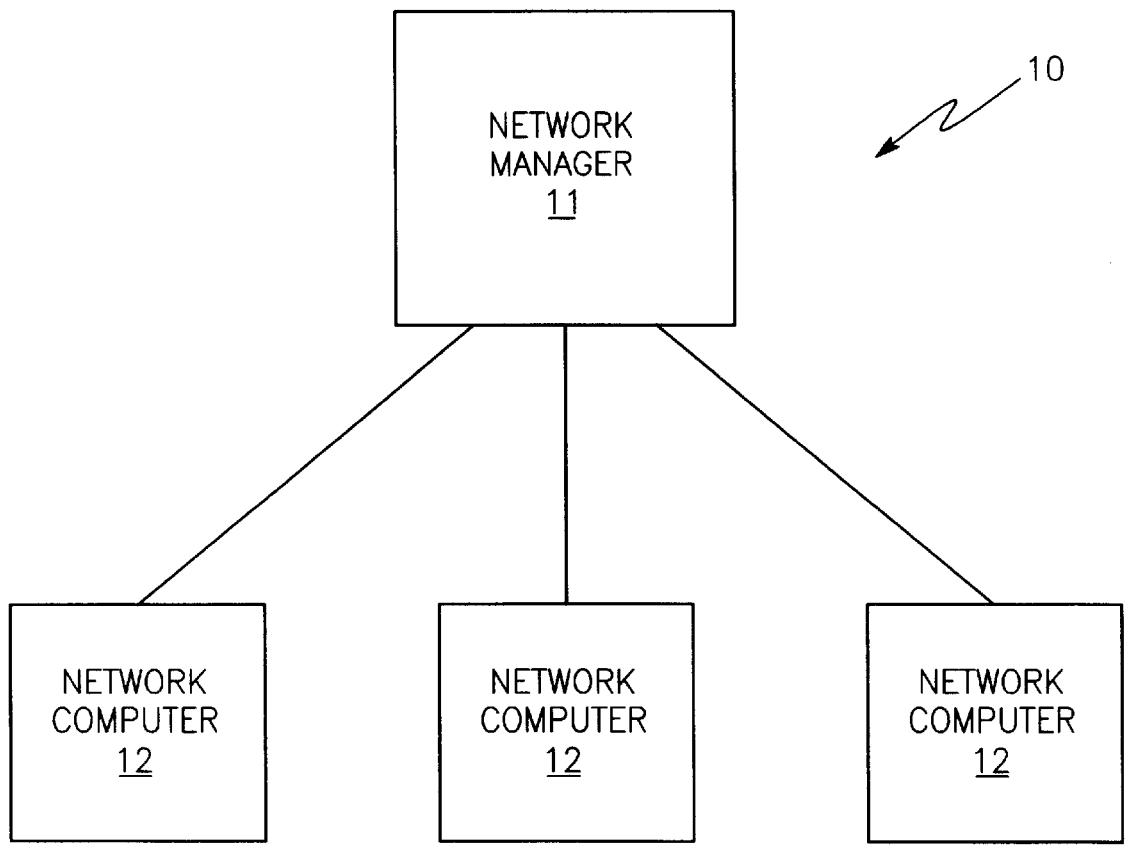
FIG. 1 is a diagrammatic representation of a computer network including several network computers which embody the principles of the invention.

The invention may be described with reference to FIGS. 1 through 3. FIG. 1 shows a computer network 10 including a network management computer or server 11 and a plurality of network computers 12. Although three network computers 12 are shown for purposes of illustrating the invention, the invention is applicable to networks having any number of network computers or other devices. Also, although a hub and spoke type network is illustrated, the invention is applicable to any arrangement by which network management computer 11 may communicate with network computers 12. In any event, each network computer 12 may perform system management operations as dictated by instructions communicated from network management computer 11.

Figure 2:
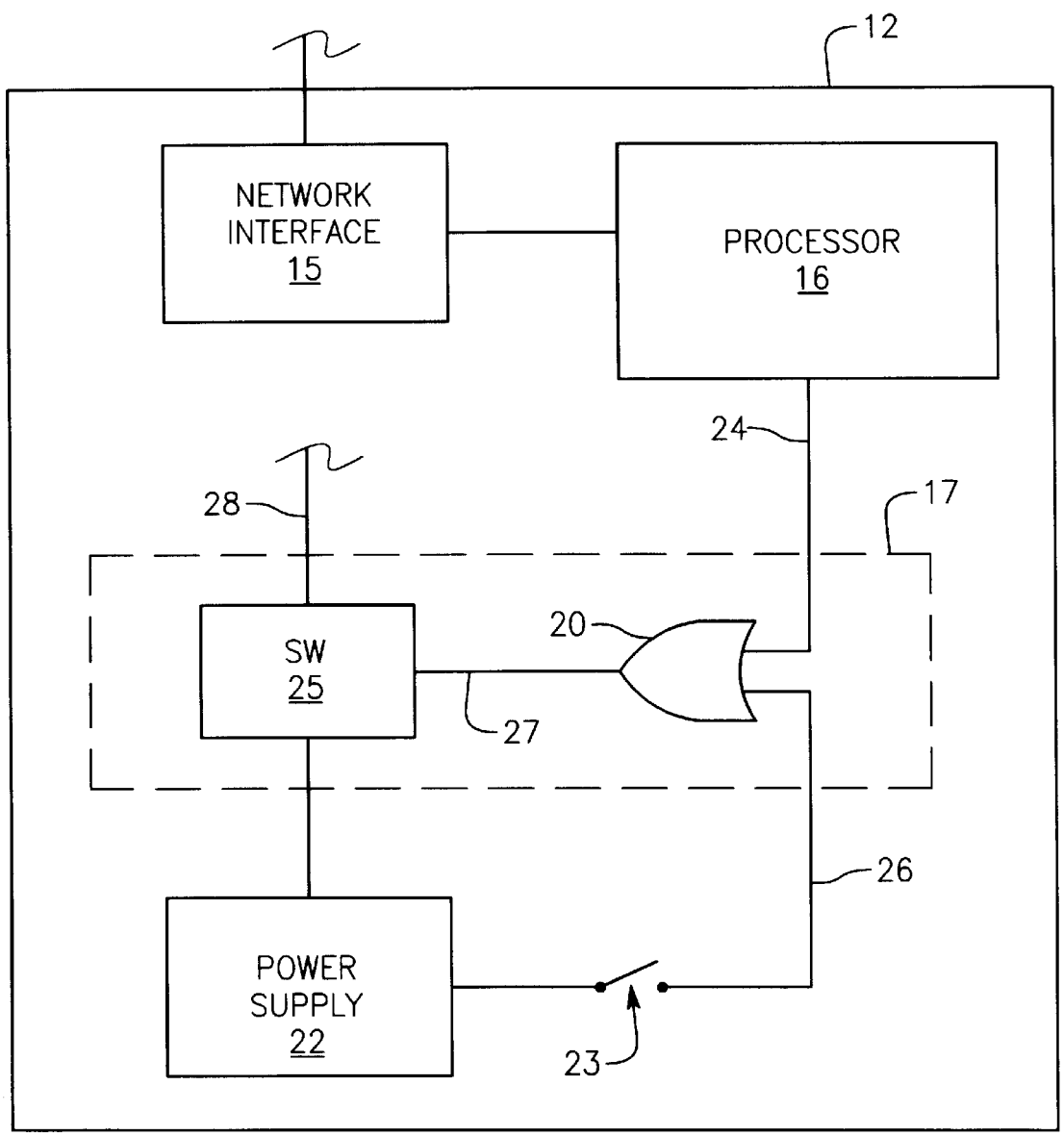
FIG. 2 is a diagrammatic representation of one of the network computers shown in FIG. 1, and particularly the apparatus associated with the computer for controlling operational status at the computer.

Referring now to FIG. 2, each network computer 12 includes a network interface 15, a processor 16, and an operational status controller shown generally at reference number 17. Network interface 15 may comprise any suitable interface apparatus which is compatible with the particular network protocol employed for network communications, and may commonly comprise a suitable network card installed in the respective network computer 12. Network communications are transmitted over a suitable communications medium shown as line 18 in FIGS. 1 and 2. Line 18 may refer to a physical transmission line or a wireless transmission path. Processor 16 comprises the central processing unit (CPU) of the respective network computer 12, and operates to execute instructions received through network interface 15. Those skilled in the art will appreciate that processor 16 has associated with it random access memory "RAM" along with other memory and storage systems and other associated devices. These details of processor 16 and network computer 12 are not necessary for an understanding of the invention and are omitted from the drawings so as not to obscure the invention in unnecessary detail.

In the form of the invention shown in FIG. 2, operational status controller 17 includes an OR gate 20. A first input to OR gate 20 is connected to line 26 and may receive a power-good voltage signal from power supply 22 through a user operated switch 23. A second input to OR gate 20 is connected to receive a hold signal through line 24. The hold signal may be a general purpose output GPO from processor 16 or units associated with the processor. The output 27 from OR gate 20 is connected to a switching element 25 which comprises a relay or other suitable switching device. Switching element 25 controls power to the network computer 12 from the system power supply 22. Although not shown in the drawing, line 28 from switching element 25 is connected to a power bus that directs power to the various components of the network computer. Also, OR gate 20 includes power connections with are not shown in the figures, and remains operational as long as power is available to the network computer 12.

Figure 3:
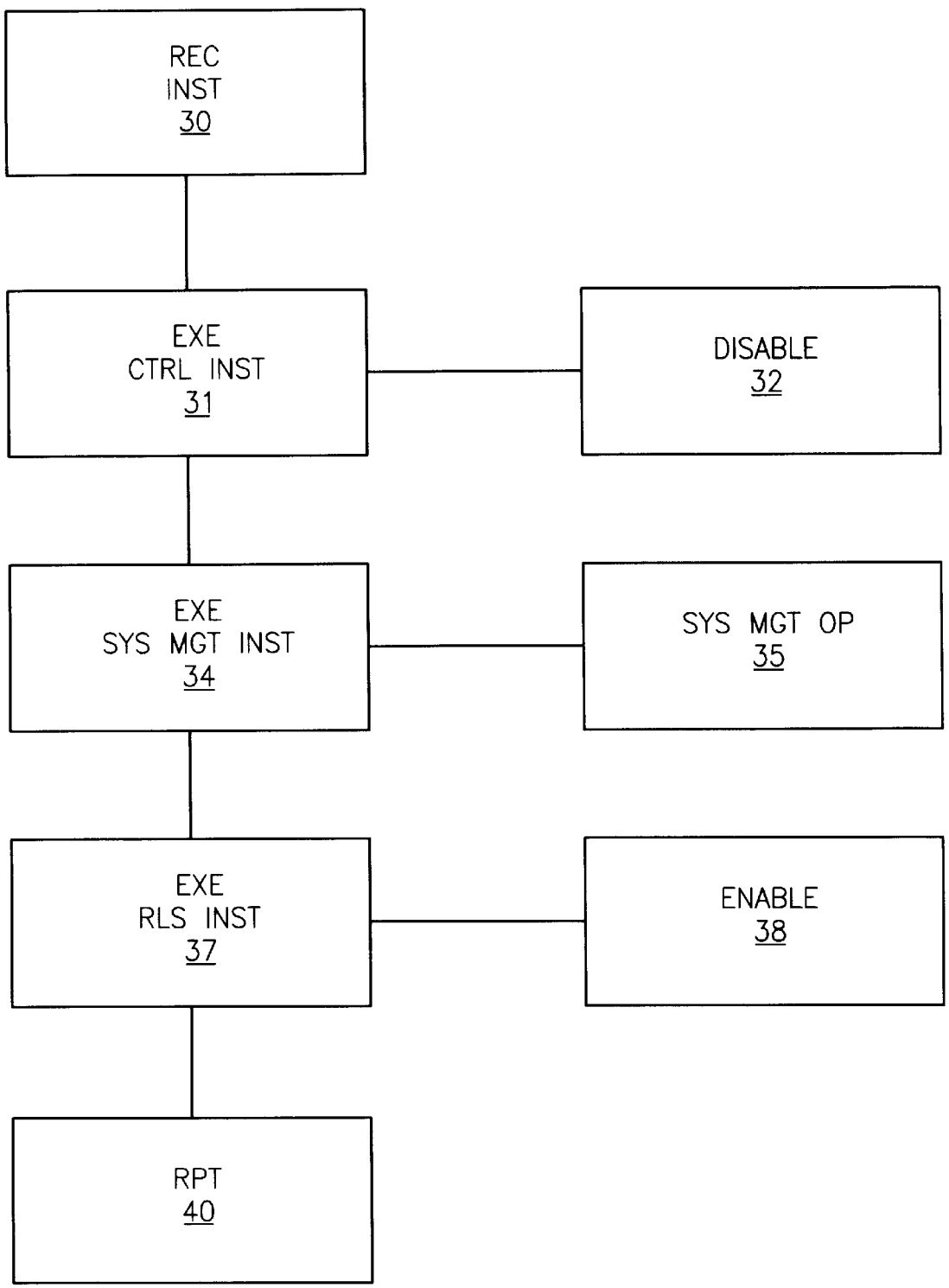
FIG. 3 is a flow chart showing a method embodying the principles of the invention for maintaining the operational status of a network computer during system management operations.

The method of the invention and the operation of the apparatus shown in FIGS. 1 and 2 may be described with further reference to the flow chart of FIG. 3. As indicated at process block 30 in FIG. 3, network computer 12 first receives instructions from network management computer 11. These instructions are received through interface 15 and include a control interrupt instruction, a system management instruction, and a release instruction. Each instruction comprises software code which is stored on any suitable memory arrangement associated with the respective network computer 12.

As shown at block 31 in FIG. 3, processor 16 executes the control interrupt instruction before the system management and release instructions. Executing the control interrupt instruction results in a control interrupt signal which affects the operation of operational status controller 17. In a preferred form of the invention, the control interrupt instruction may comprise a call to firmware associated with network computer 12. Processor 16 then executes the selected firmware instruction to produce a control interrupt signal. Alternatively, the control interrupt instruction may comprise an application which processor 16 executes directly to produce the control interrupt signal, or direct an associated unit to produce the control interrupt signal.

As shown at block 32, the control interrupt signal disables local operational status control at network computer 12. Disabling "local operational status control" in this sense means disabling the switch by which the computer may be turned "off" or placed in some inactive state. Once disabled, the computer 12 does not turn "off" or go to an inactive state even if the switch is activated at the computer. In the example shown in FIG. 2, the control interrupt signal comprises, or results in, a logical "high" level general purpose output (GPO), or hold signal, applied on line 24. This hold signal is ORed at OR gate 20 with the power-good signal on line 26, and the output of this logical operation is applied to control switching element 25. As long as the hold signal is applied through line 24, switching element 25 remains closed to provide power throughout network computer 12, even if switch 23 is opened. In this disabled condition, network computer 12 remains in an active operational status and the user cannot turn the computer off except by physically unplugging the computer from the local power supply.

With local operational control disabled at network computer 12, the method continues at block 34 with the step of processing or executing the system management instruction with processor 16. Executing the system management instruction causes processor 16 to perform a system management operation as shown at process block 35. This operation may comprise, for example, updating the "boot" code associated with network computer 12, or any other system management operation.

After the system management operation is completed at block 35, processor 16 executes the release instruction at block 37 to produce a release signal. As with the control interrupt signal, the release signal may be produced directly by processing the release instruction, or the release instruction may comprise a call to a firmware instruction which is executed to produce the release signal. In either case, the operational status controller 17 responds to the release signal by enabling local operational status control at block 38. In the example shown in FIG. 2, the release signal comprises, or produces, a logical "low" level voltage signal at line 24. With a "low" level signal at line 24, the power-good signal at line 26 controls the output of OR gate 20 and thus the position of switching element 25. If user operated switch 23 is opened, the output 27 of OR gate 20 goes "low" to open switching element 25 and block power to network computer 12.

Finally, after the release instruction is executed, processor 16 may execute a report instruction as shown at process block 40. The report instruction may cause network computer 12 to report back to the system management computer 11, for example, to indicate if the particular system management operation was successfully executed.

Numerous variations to the above described apparatus and method may be made within the scope of the invention and following claims. For example, although block 30 shows all instructions being received simultaneously, the system management and release instructions may be communicated to network computer 12 after the control interrupt instruction is successfully executed. Receiving the system management instruction and release instructions separately after receipt or execution of the control interrupt instruction is to be considered an equivalent to the steps shown in FIG. 3 and set out in the following claims. Furthermore, although each instruction is referred to in the singular, each instruction may comprise a number of individual software instructions. In some forms of the invention, the release instruction may be part of a set of instructions which comprise the system management instruction. In fact, the control interrupt instruction, system management instruction, and release instruction may be part of a single application downloaded from system management computer 11 to execute on network computer 12. These variations are to be considered equivalent to the individual instructions described above and set out in the following claims.

Figure 4:
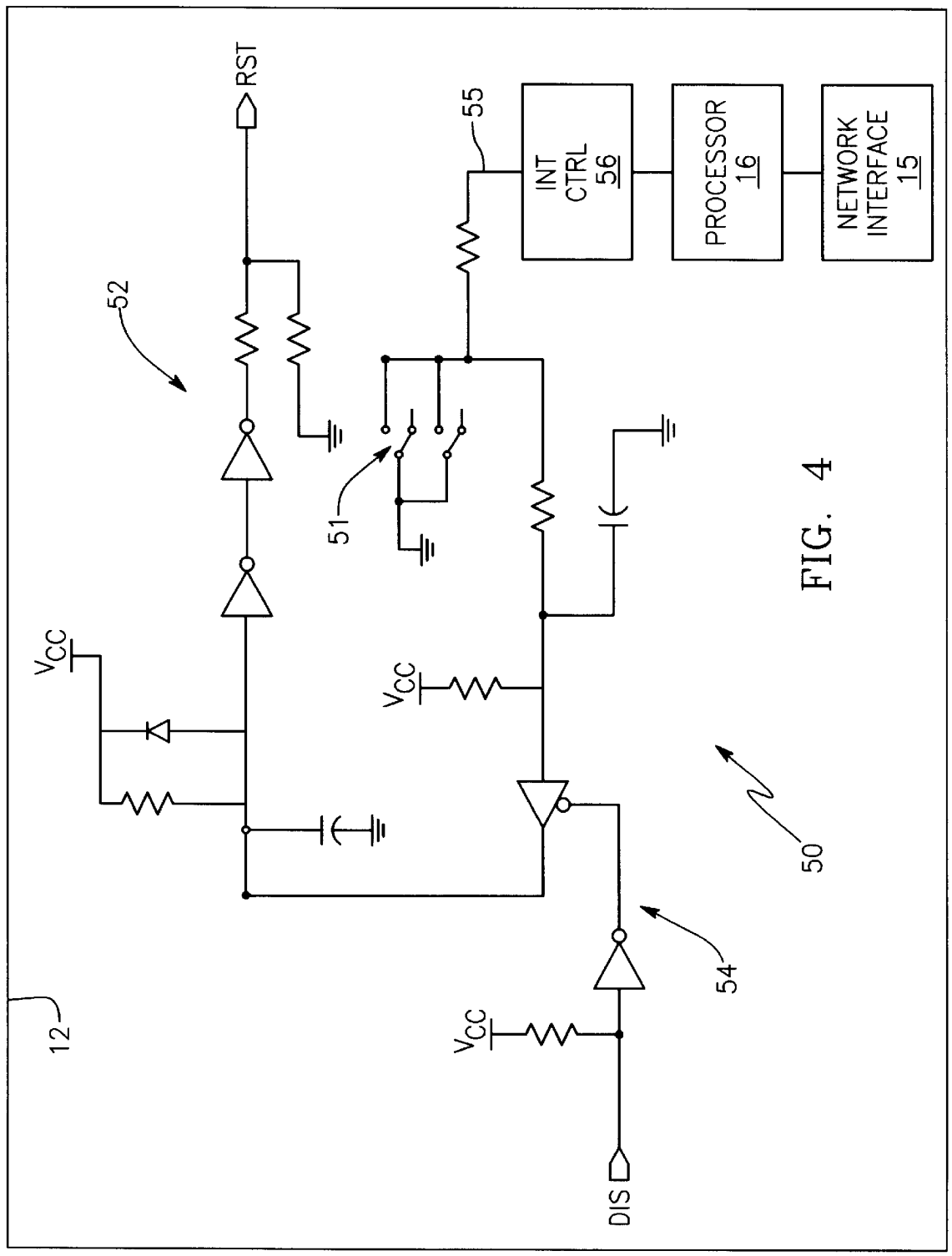
FIG. 4 is a diagrammatic representation of one of the network computers shown FIG. 1, but with an alternate switching arrangement for switching the operational status of the network computer.

FIG. 4 illustrates network computer 12 having an operational state switching arrangement 50 which may be employed as an alternative to the power supply switching arrangement shown in FIG. 2. Network computer 12 shown in FIG. 4 also includes network interface 15 and processor 16 similarly to the network computer illustrated in FIG. 2. Switching arrangement 50 is described in detail in U.S. patent application Ser. No. 09/234,166, filed, Jan. 21, 1999, entitled "OPERATIONAL STATE SWITCHING APPARATUS AND METHOD FOR NETWORK COMPUTERS," and still pending the disclosure of which is incorporated herein by this reference.

This alternative switching arrangement 50 includes a switch 51, a system reset arrangement shown generally at reference numeral 52, and a reset disable arrangement shown generally at reference numeral 54. Switching arrangement 50 also includes an internal interrupt line 55 connected to provide an internal interrupt signal to an interrupt controller 56.

According to the logic of switching arrangement 50 illustrated in FIG. 4, switch 11 is biased to the open position. When the network computer 12 is in a normal operational state, closing switch 51 produces an internal interrupt signal on line 55 to interrupt controller 56. Interrupt controller 56 responds to the internal interrupt signal by directing the network computer 12 to go to a standby state. The process of going to the standby state or the standby state itself could interfere with a network management operation to be performed on the network computer 12.

In the form of the invention using switching arrangement 50, the operational status controller comprises interrupt controller 56. According to the invention, interrupt controller 56 responds to a control interrupt signal from processor 16 by ignoring, or becoming unresponsive to, an internal interrupt signal applied through line 55. Thus, referring back to the process shown in FIG. 3, after executing the control interrupt instruction at process block 31, the resulting control interrupt signal at block 32 disables local operational status control in network computer 12 by causing interrupt controller 56 to become unresponsive to an internal interrupt signal. If a user activates switch 51 when interrupt controller 56 is unresponsive to an internal interrupt signal on line 55, network computer 12 continues in its normal operational state in which it may execute system management operations.

After the system management operation is performed on network computer 12 at process block 35 in FIG. 3, the release instruction is executed to produce the release signal as shown at block 37 in FIG. 3. Interrupt controller 56 responds to the release signal by becoming responsive to an internal interrupt signal applied through line 55. Thus, with the switching arrangement 50 shown in FIG. 4, local operational status control is restored or enabled (block 38 in FIG. 3) in the network computer 12 by placing the interrupt controller 56 in a condition in which it is responsive to an internal interrupt on line 55.

The above described preferred embodiments are intended to illustrate the principles of the invention, but not to limit the scope of the invention. Various other embodiments and modifications to these preferred embodiments may be made by those skilled in the art without departing from the scope of the following claims. For example, the logic used to control switching element 25 in FIG. 2 may comprise any suitable logical operation and is not limited to the logical OR shown in the figure. Also, the logical signals employed by the invention are not limited to any particular signal type or range of values.

What is claimed is:

1. Apparatus associated with a network computer for maintaining a desired operational status in the network computer during system management tasks to be performed by the computer, the apparatus comprising:

(a) a network interface for receiving a control interrupt instruction, a system management instruction, and a release instruction;

(b) processing means for (i) executing the control interrupt instruction to produce a control interrupt signal, for (ii) executing the system management instruction after the control interrupt instruction has been executed and the control interrupt signal produced, and for (iii) executing the release instruction to produce a release signal after the system management instruction has been executed; and (c) an operational status controller for (i) receiving the control interrupt signal and, in response to the control interrupt signal, disabling local operational status control in the network computer, and for (ii) receiving the release signal and, in response to the release signal, enabling local operational status control in the network computer.

2. The apparatus of claim 1 wherein operational status is controlled locally at the network computer with a user operated switch which is activated by a user to produce an internal interrupt, and wherein the operational status controller comprises:

(a) an interrupt controller which becomes unresponsive to the internal interrupt in response to the control interrupt signal and becomes responsive to the internal interrupt signal in response to the release signal.

3. The apparatus of claim 1 wherein operational status is controlled locally at the network computer with a user operated switch which is activated by a user to produce a power good signal which causes the network computer to reside in an active operational state, and wherein the operational status controller comprises:

(a) power control logic for maintaining the active operational state in the network computer after the power good signal is removed.

4. The apparatus of claim 3 wherein the power control logic comprises:

(a) an OR gate connected to receive the power good signal at a first input and a hold signal at a second input, the OR gate having an output connected to a power switching element for the network computer, and the hold signal being derived from the control interrupt signal.

5. A method for maintaining a desired operational status in a network computer during system management tasks to be performed by the computer, the method comprising the steps of:

(a) receiving at the network computer a control interrupt instruction, a system management instruction, and a release instruction;

(b) executing the control interrupt instruction to produce a control interrupt signal;

(c) disabling local operational status control in the network computer in response to the control interrupt signal;

(d) executing the system management instruction after the control interrupt instruction has been executed and the control interrupt signal produced to disable local operational status control in the network computer;

(e) after the system management instruction has been executed, executing the release instruction to produce a release signal; and (f) enabling local operational status control in the network computer in response to the release signal.

6. The method of claim 5 wherein operational status is controlled locally at the network computer with a user operated switch which is activated by a user to produce an internal interrupt for an interrupt controller associated with the network computer, and wherein the step of disabling local operational status control in the network computer comprises:

(a) placing the interrupt controller in a condition in which it is unresponsive to the internal interrupt.

7. The method of claim 5 wherein operational status is controlled locally at the network computer with a user operated switch which is activated by a user to produce a power good signal which causes the network computer to reside in an active operational state, and wherein the step of disabling local operational status control in the network computer comprises:

(a) performing a logical operation to maintain the active operational state in the network computer after the power good signal is removed.

8. The method of claim 7 wherein the logical operation comprises:

(a) ORing the power good signal and a hold signal, the hold signal being derived from the control interrupt signal; and (b) applying the output of the OR operation to a power switching element for the network computer.

9. A program product adapted to be executed on a network computer for maintaining a desired operational status in the network computer during system management tasks to be performed by the computer, the program product comprising:

(a) a computer readable medium;

(b) a control interrupt instruction stored on the computer readable medium for causing the network computer to produce a control interrupt signal to which the network computer responds by disabling local operational status control in the network computer;

(c) a system management instruction stored on the computer readable medium for causing the network computer to perform a network management task after the control interrupt signal has been produced and local operational status control disabled in the network computer;

(d) a release instruction for causing the network computer to produce a release signal after the system management instruction has been executed, the network computer responding to the release signal by enabling local operational status control in the network computer.

10. The program product of claim 9 wherein operational status is controlled locally at the network computer with a user operated switch which is activated by a user to produce an internal interrupt for an interrupt controller associated with the network computer, and wherein:

(a) the control interrupt signal places the interrupt controller in a condition in which it is unresponsive to the internal interrupt.

11. The program product of claim 9 wherein operational status is controlled locally at the network computer with a user operated switch which is activated by a user to produce a power good signal which causes the network computer to reside in an active operational state, and wherein:

(a) the control interrupt signal initiates a logical operation in the network computer which maintains the active operational state in the network computer after the power good signal is removed.

12. The program product of claim 11 wherein the logical operation comprises:

(a) ORing the power good signal and an override signal, the override signal being derived from the control interrupt signal; and (b) applying the output of the OR operation to a power switching element for the network computer.

* * * * *